United States Patent [19]
Hertzberg et al.

[11] Patent Number: 5,203,603
[45] Date of Patent: Apr. 20, 1993

[54] TELESCOPIC CAMPER CAP

[75] Inventors: William E. Hertzberg, Santa Barbara; Michael J. Botich, Ventura; Mark Murphy, Thousand Oaks, all of Calif.

[73] Assignee: Zipper Project Incorporation, Santa Barbara, Calif.

[21] Appl. No.: 261,366

[22] Filed: Oct. 24, 1988

[51] Int. Cl.⁵ .............................................. B60P 7/02
[52] U.S. Cl. .................................. 296/100; 296/165
[58] Field of Search ............... 296/100, 105, 165, 175, 296/176, 26; 105/377

[56] References Cited

U.S. PATENT DOCUMENTS

| D. 310,806 | 9/1990 | Hertzberg et al. | D12/156 |
|---|---|---|---|
| 3,124,386 | 3/1964 | Jonas | 296/176 |
| 3,342,523 | 9/1967 | Lutgen | 296/100 |
| 4,068,886 | 1/1978 | Gostomski | 296/100 |
| 4,659,136 | 4/1987 | Martin et al. | 296/100 |
| 4,784,429 | 11/1988 | Hodges | 296/165 |
| 4,799,726 | 1/1989 | Scott | 296/100 |

Primary Examiner—Charles A. Marmor
Assistant Examiner—Andrew C. Pike
Attorney, Agent, or Firm—Blakely, Sokoloff, Taylor & Zafman

[57] ABSTRACT

A telescopic cover assembly comprises a fixed cover member fixedly mounted atop the walls of the load bed section of a vehicle, at least one movable cover member, and a track assembly mounted upon the walls and into which each movable cover member is slidably engaged. Each movable cover member comprises a frame member having left and right base members extending on the sides of the movable cover member from its front to its rear, left and right front support members extending upwards from the front of the base members, left and right rear support members extending upwards from the rear of the base members, each of the front and rear support members having substantially the same height, a front roll bar extending from the top of the left front support member to the top of the right front support member, and a rear roll bar extending from the top of the left rear support member to the top of the right rear support member, a top panel member disposed substantially horizontally between the front and rear roll bars, and side panel members disposed substantially vertically between the front and rear support members. The outer surface of the top panel member is depressed inwardly from the outer surface of the front and rear roll bars and the outer surface of each of the side panels is depressed inwardly from the outer surface of the front and rear support members to which it is attached.

6 Claims, 6 Drawing Sheets

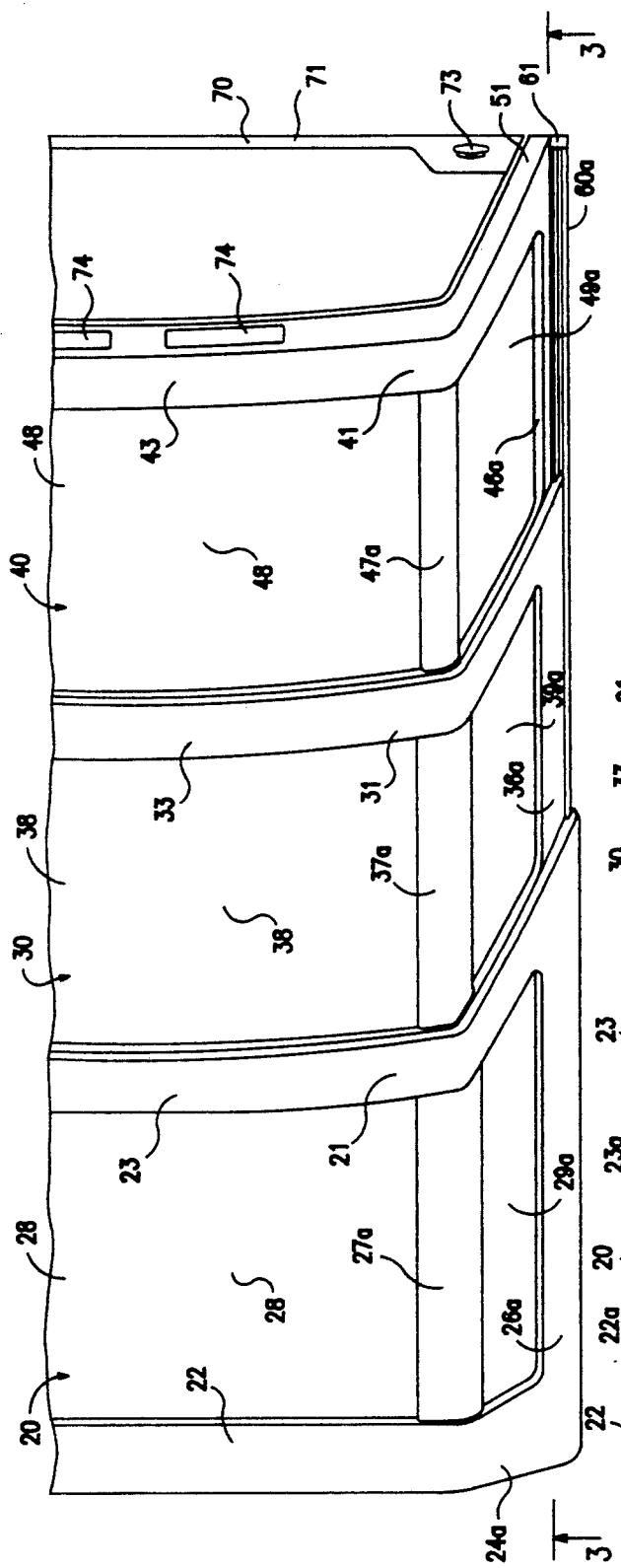
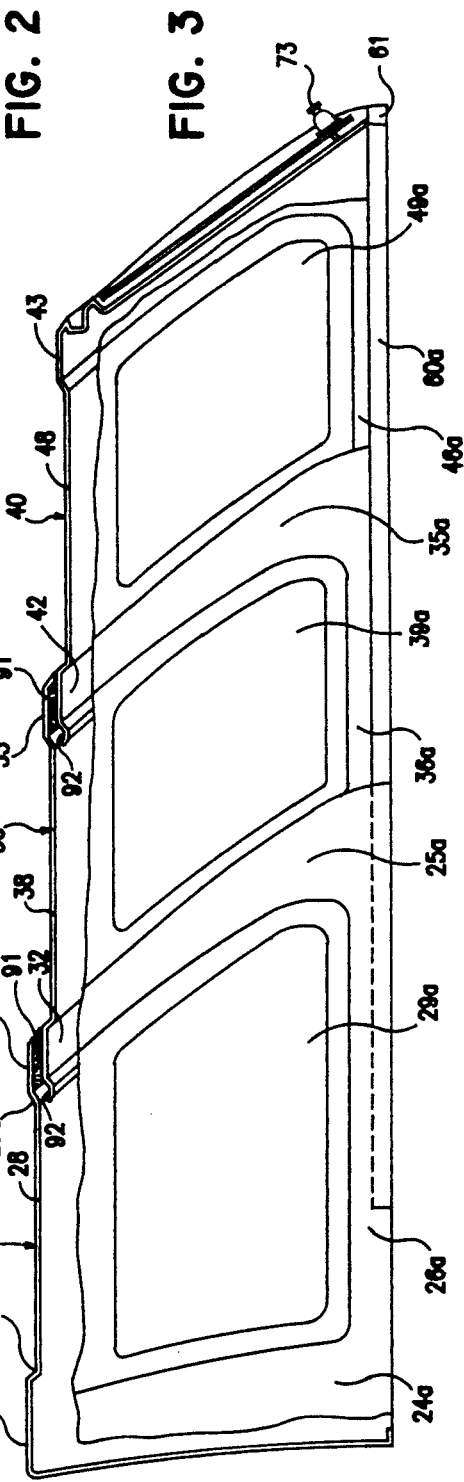
FIG. 2
FIG. 3

TELESCOPIC CAMPER CAP

BACKGROUND OF THE INVENTION

1. Field of The Invention

This invention relates to cover assemblies for open bed vehicles, such as pick-up trucks and the like. More specifically, this invention relates to the field of telescoping covers or camper shells (sometimes referred to as "camper caps") for pick-up trucks and similar vehicles.

2. Prior Art

Pick-up trucks and open bed utility vehicles have achieved a sustained popularity. This is due to the fact that they can perform many of the same functions as an ordinary passenger car, yet are easily adapted to perform work and recreational functions. Particularly, they can carry heavy or large-sized loads that would not fit into an ordinary passenger car or station wagon.

As is well known through ordinary observance of vehicles on streets and highways, as well as from reading advertisements in newspapers and magazines and watching television, pick-up trucks typically comprise a cab section in which the driver and one or two passengers may be seated, with the engine disposed in front of the cab section. Behind the cab section is an open load bed section comprised of a flat rectangular bed surface having upstanding walls on each side and a door upstanding from the rear end, which door may be constructed to open downwards or to the side depending upon the design choice of the manufacturer. The load bed section is open at the top.

The pick-up truck is thus very easy to load, with access available over either of the side walls or directly onto the bed surface at the rear when the rear door is open. Since many pick-up trucks have a cab section with a rear window which may be opened, access may be had to the load bed through the rear of the pick-up truck's cab section.

Because the load bed is left open to the elements, items carried on the pick-up truck during bad weather may become spoiled or damaged as a result, and items left in the load bed may be observed and removed by thieves.

A simple solution to this problem is to cover the load bed with a tarpaulin or canvas extending from the rear of the cab section to the rear of the load bed along the top of the side walls and the rear door. However, tarpaulin or canvas is not as weatherproof as desired, is very easily susceptible to damage, may be easily overcome by thieves, and would substantially limit the height of the items that could be put in the load bed. The deficiencies of using a tarpaulin or canvas covering were attempted to be overcome by the addition of an enclosure or camper shell over the load bed section of the pick-up truck. Examples of such camper shells are shown in U.S. Pat. No. Des. 257,970 issued to Handwerk; U.S. Pat. No. Des. 232,628 issued to Douglas et al.; U.S. Pat. No. 2,848,274 issued to Geisler et al.; U.S. Pat. No. 3,990,736 issued to Baumer; and U.S. Pat. No. 4,157,201 issued to Collins et al.

A typical camper shell is made of aluminum, fiberglass, or other substantially rigid plastic material. It has vertical walls on either side engaging the side walls of the load bed section of the pick-up truck, a rear door spanning the rear edges of the shell's side walls, and a cover extending over the rear door and the side walls. The camper shell is typically disposed so that its side walls seal, at least temporarily, with the side walls of the load bed, and the front end of the camper shell seals with the back of the cab section of the pick-up truck. While a typical camper shell is designed to be removable, it is usually too bulky for one person to manage and requires a lot of room for storage. Also, while it is on the pick-up truck, it of course limits the height of the items which the pick-up truck may carry.

The problems suffered by the camper shells discussed above have been solved by the introduction of camper shells having sections which telescope into each other. A typical telescoping camper shell comprises a plurality of cover segments at least one of which is longitudinally movable relative to another. The movable segments comprise wheeled or sliding assemblies fitted in a pair of track assemblies disposed along the upper portions of the side walls of the load bed of the pick-up truck.

The advantages of using a telescoping camper cap are that the individual segments may be more easily handled by a single individual, the camper cap may be stored in a smaller space than the traditional single segment camper shells, and in many cases it eliminates the need for removal. In addition, with the telescoped segments in their extended position, such a camper cap provides all the advantages provided by the unitary camper shells; that is, providing weather and theft resistance over the entire length of the load bed. Further, the sections may be pushed into their retracted position and left on the load bed, and tall loads may be placed in the rear portion of the pick-up truck's load bed.

Examples of telescoping camper shells are shown in U.S. Pat. No. 3,165,352 issued to Hallock et al ; U.S. Pat. No. 3,342,523 issued to Lutgen; U.S. Pat. No. 3,640,565 issued to Anderson; and U.S. Pat. No. 4,068,886 issued to Gostomski.

The prior art telescoping camper caps, however, are not attractive, have track segments which are either difficult to manufacture or maintain, and are susceptible to binding due to introduction of dirt into the track assemblies; and are susceptible of having the exposed surfaces of the movable segments scratched or otherwise marred while being moved relative to each other and the stationary segment of the camper shell. The scratching is caused when dirt or other abrasive material gets lodged in the gasket or other sealing surface used for sealing the adjacent ends of telescoping cover sections. When one section is slid under the other, dirt trapped in the gasket will scratch the top surface of the sliding member.

Other prior art in the field includes U.S. Pat. No. 3,508,786 issued to Colville; and U.S. Pat. No. 3,850,470 issued to Trelle.

SUMMARY OF THE INVENTION

The subject invention is a camper cap comprising a stationary segment and one or more movable segments which telescope into the stationary segment. Each of the segments is approximately as wide as the width of the load bed of the pick-up truck and each has a length which is a fraction of the length of the load bed. Each segment is slightly less tall and slightly less wide than the segment in front of it.

Each segment comprises a frame member having left and right front support members, left and right rear support members, a left base member connecting the left front support member and the left rear support member and a right base member connecting the bottom portion of the right front support member to the bottom portion of the right rear support member, a front roll bar connecting the top of the left front support member to the top of the right front support member and a rear roll bar connecting the top of the left rear support member to the top of the right rear support member. All outer portions of the frame form a continuous single surface. Each segment also comprises a left side rail disposed between the juncture of the front roll bar and the left front support member and the juncture of the rear roll bar and the left rear support member and a corresponding right side rail disposed between the juncture of the front roll bar and the right front support member and the juncture of the rear roll bar and the top of the right rear support member. The outer surface of the side rail is disposed slightly inward from the outer surface of the frame member.

Each segment further comprises a top panel member disposed in the space defined by the front and rear roll bars and the left and right side rails, and each segment also comprises left and right side panel members disposed in the spaces defined by the left front support, left rear support, left base member and left side rail member, and the right front support and right rear support members, the right side rail, and the right base member, respectively. The outer surfaces of the top and side panel members are depressed slightly inwardly from the outermost surface of the side rails.

The subject invention also includes left and right track sections disposed along the top portion of the upstanding side walls of the load bed section. Each track section comprises one or more channels running the entire length of the track section. Attached to the bottom of the base members of the movable camper cap segments are brackets having dowels suspended below them which slide within the channels of the track sections. The channels are hexagonal in shape.

Disposed on the underside or inner side of the rear roll bar and rear support members of all but the rearmost of the camper cap segments is a gasket formed of rubber or similar material to seal the camper cap. In the preferred embodiment the rearmost segment has a door attached to the rear portion of the rear roll bar and rear support members.

DESCRIPTION OF THE DRAWINGS

FIG. 2 is a partial top view of the subject invention taken along line 2—2 in FIG. 1.

FIG. 3 is a partial cross-sectional view of the subject invention taken along line 3—3 of FIG. 2, showing the invention in the fully extended position.

DETAILED DESCRIPTION OF THE INVENTION

Figure 1:
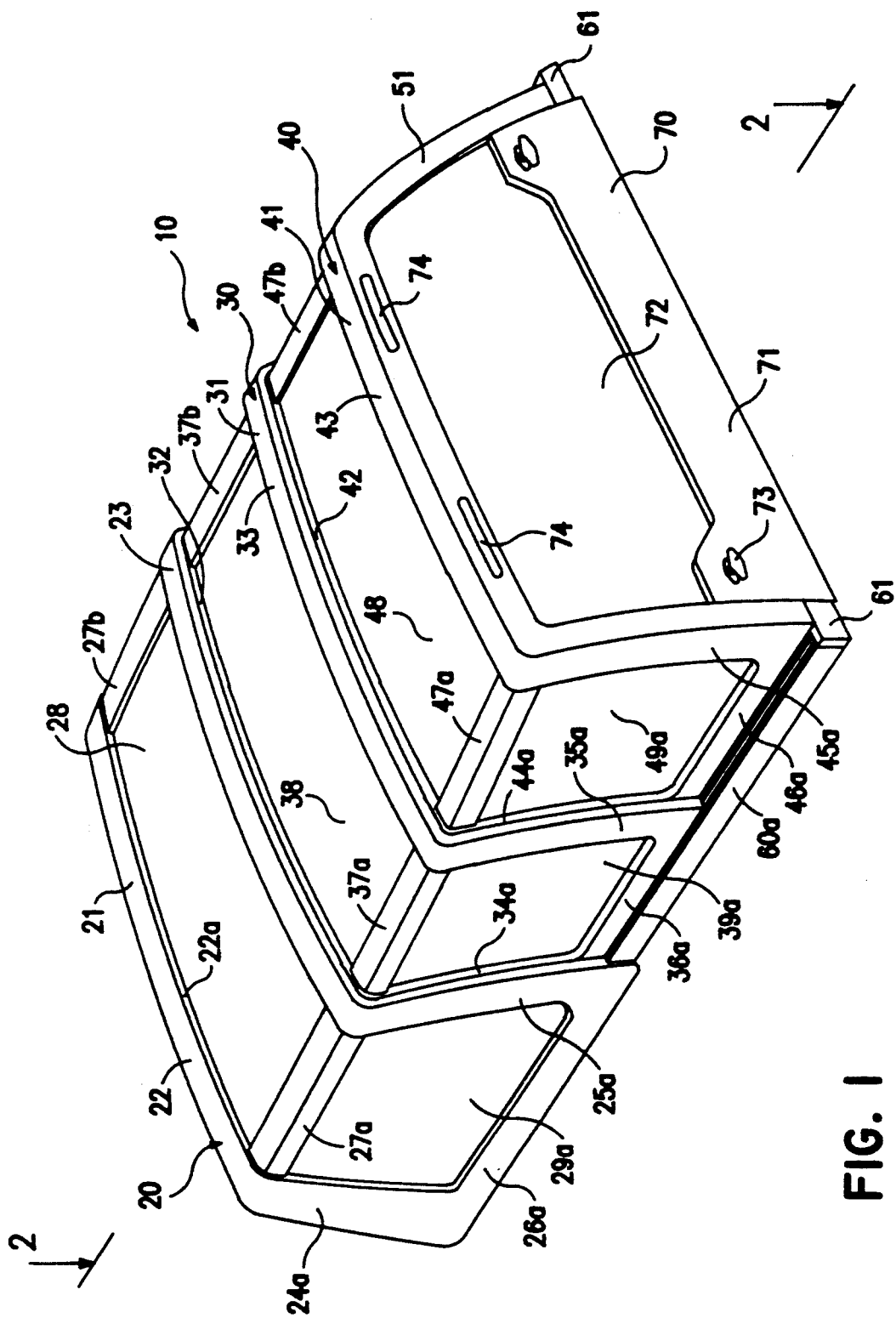
FIG. 1 is a perspective view of the camper cap of the subject invention, viewed from the left rear thereof.

The preferred embodiment of the subject invention is illustrated in the attached drawings which are referred to herein. The same reference numeral will be used to identify identical elements throughout the drawings.

Figure 4:
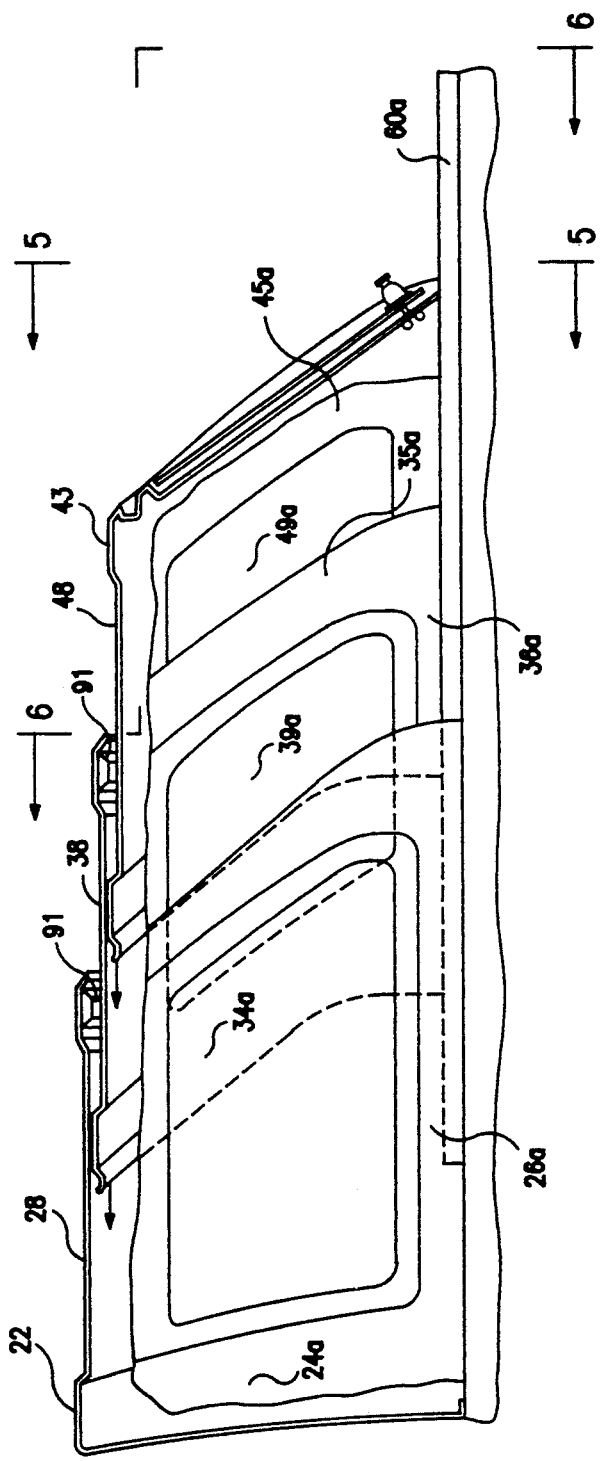
FIG. 4 is a partial cutaway view of the subject invention similar to that taken along line 3—3 showing the camper cap in a partially retracted position as viewed from the left side thereof.
Figure 5:
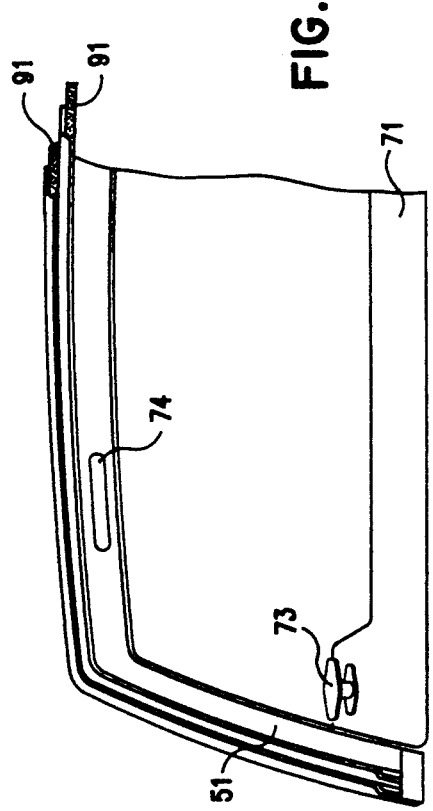
FIG. 5 is a partial rear, cross-sectional view of the subject invention taken along line 5—5 of FIG. 4.
Figure 6:
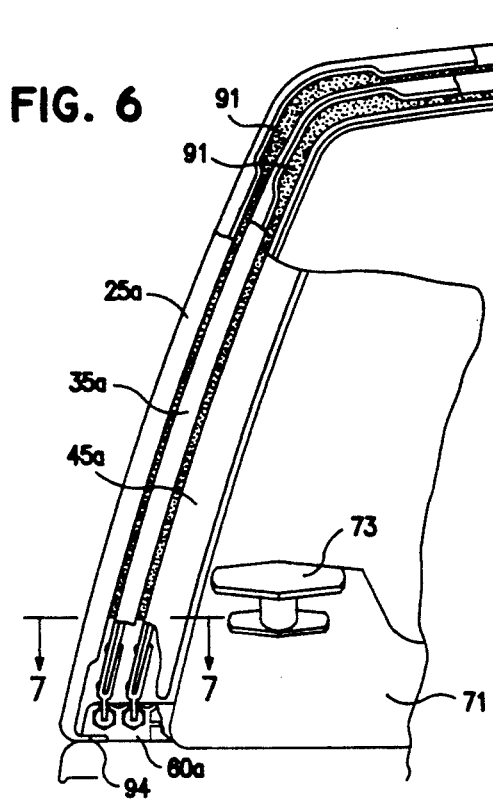
FIG. 6 is partial cutaway rear view of the subject invention taken along line 6—6 of FIG. 4.
Figure 8:
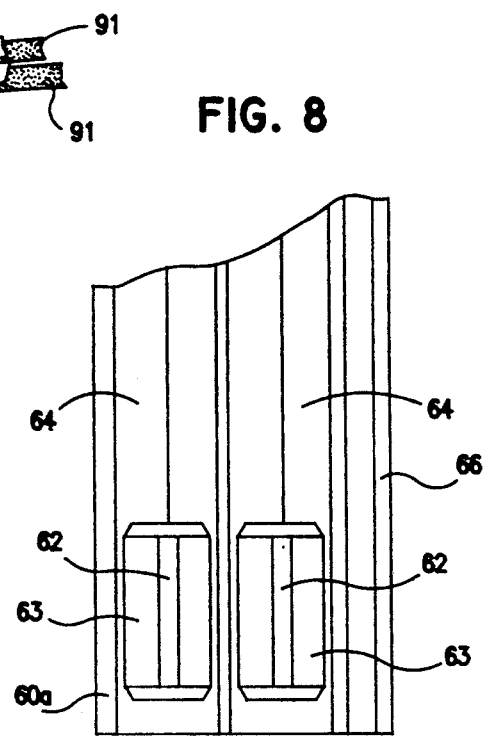
FIG. 8 is a top cross-sectional view of a portion of the invention taken along line 8—8 of FIG. 7.
Figure 7:
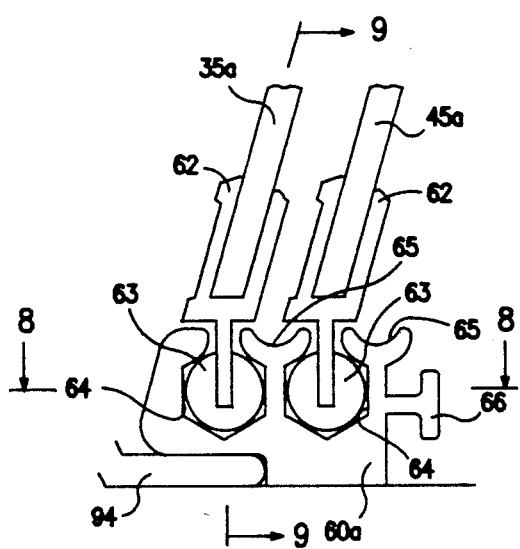
FIG. 7 is an expanded view of a portion of the invention taken along line 7—7 of FIG. 6.
Figure 9:
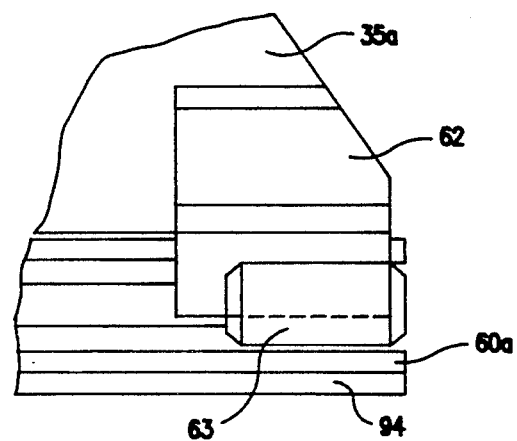
FIG. 9 is a side cutaway view of the same portion of the invention that is shown in FIG. 7 taken along line 9—9 therein.

Referring to FIGS. 1, 2, 3, 10, and 11, the camper cap 10 of the subject invention is shown in its extended position. In the preferred embodiment the camper cap is comprised of three segments, or cover members, although the subject invention includes camper caps having two or more segments. In the preferred embodiment the segment closest to the cab section 112 of the pick-up truck 100 is the segment with the greatest height and width, the next closest segment to the pick-up truck's cab section has a slightly smaller height and width, and each segment disposed farther away from the pick-up truck's cab is progressively smaller in height and width so that when the camper cap is put in its retracted position the segments may telescope within each other or be arranged in a nested fashion. In the preferred embodiment each of the segments is attached to camper cap left side track assembly 60a and right side track assembly 60b (the left side track assembly is shown in FIGS. 1, 4, and 6, and the right side track assembly (shown in FIG. 10) is the same as the left side track assembly, except that it is its mirror image) which are mounted along the top portion of the left and right upstanding side walls 114 and 116, respectively, of the load bed section 110 of the pick-up truck. (Unless otherwise specified, the terms left and right refer to the respective sides of the camper cap and the pick-up truck when looking from the rear toward the front of the pick-up truck.)

The track assemblies 60a and 60b are affixed to the top portion of the load bed's side walls by bolts or any other suitable means. In the preferred embodiment the camper cap segment closest to the pick-up truck's cab section 112 has a thin, inwardly turned flange 94 at the bottom thereof which is placed atop the load bed's side walls (shown in FIG. 6 is the flange along the bottom of the left side of the frontmost camper cap section; an identical but mirror image flange is disposed along the bottom of the right side (not shown) of the frontmost camper cap section). The track assembly is placed over flange 94 and the segment is held in place when the track assembly is bolted to the upper portion of the load bed's side walls. Thus, the segment closest to the cab (hereinafter referred to as the "first segment") is immovable when in use; however, for custom uses the first segment can be designed so that it too is slidable. The other segments are slidably mounted onto the track assemblies.

Figure 10:
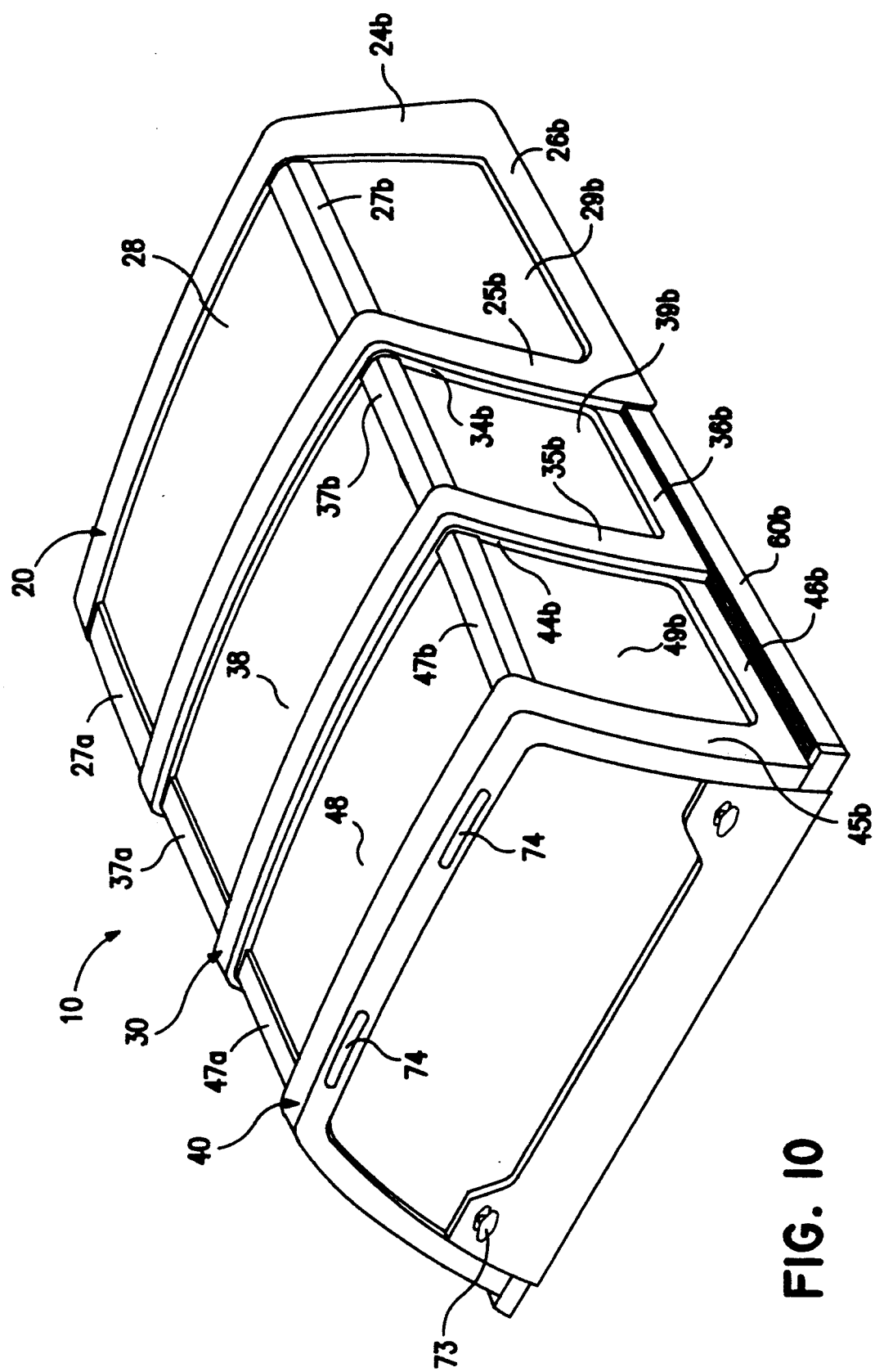
FIG. 10 is a perspective view of the camper cap of the subject invention, viewed from the right rear thereof.
Figure 11:
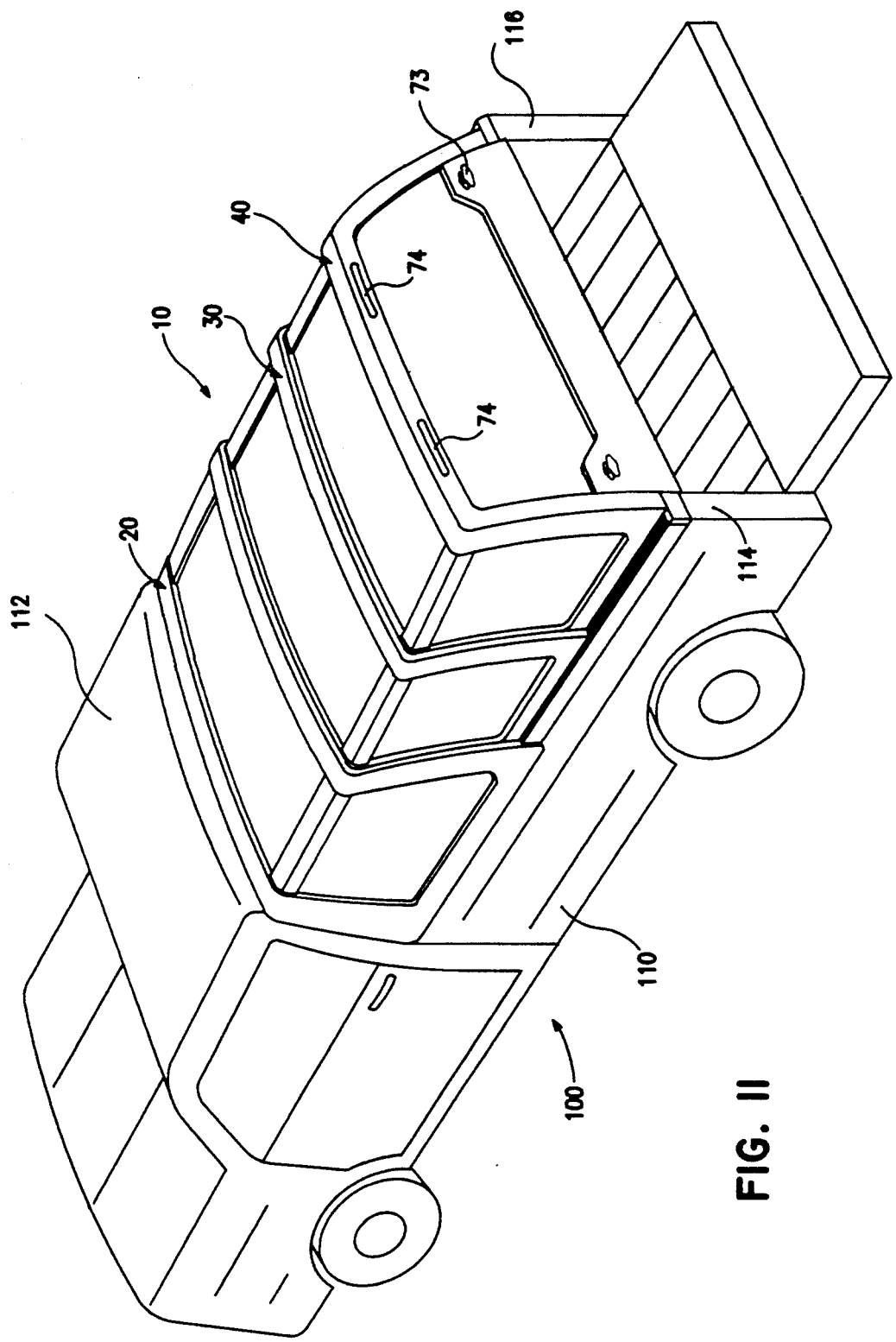
FIG. 11 is a perspective view of the camper cap of the subject invention placed upon the load bed section of a pick-up truck, viewed from the left rear thereof.

Referring to FIGS. 1 and 10, the first assembly is designated by the reference numeral 20. Reference numerals 30 and 40 refer to the segments progressively farther away from the cab of the pick-up truck. In most respects, each segment is similar to the other two segments. With respect to the first segment, it comprises a frame 21. The frame comprises left base member 26a and a corresponding right base member 26b (which is the mirror image of the left base member 26a and is disposed on the right side of the camper cap), left front support member 24a and a corresponding right front support member 24b (which is the mirror image of the left front support member 24a and is disposed on the right side of the camper cap) upstanding from the front of the respective base members, left rear support member 25a and a corresponding right rear support member 25b (which is the mirror image of the left rear support member 25a and is disposed on the right side of the camper cap) upstanding from the rear portion of the left and right base members, respectively, with the rear support members having the same vertical height as the front support members. In addition, frame 21 of the first segment comprises front roll bar 22 which spans across from the top of the left front support member to the top of the right front support member, and rear roll bar 23 which spans across from the top of the left rear support member to the top of the right rear support member. The outer surface of the frame (i.e., of the front and rear roll bars, the front and rear support members, and the base members) forms a smooth, continuous surface. (As used herein, the terms "outer" and "outward" refers to the direction which is away from the interior of the load bed section. The terms "inner" and "inward" refer to the direction toward the interior of the load bed section.)

The first segment also comprises left and right side rails 27a and 27b, respectively. These are connected, respectively, at one end to the frame at the junction of the front roll bar and the top of the front support member, and at the other end at the junction of the rear roll bar and the top of the rear support member on each side. The outer surface of the side rails is depressed slightly inwardly from the outer surface of the frame. In the preferred embodiment each side rail comprises a substantially horizontal surface and a substantially vertical surface formed so that its entire outer surface is one continuous surface. In the preferred embodiment the outer surface of each of the side rails is depressed approximately ⅛ of an inch inward of the outer surface of the frame member.

Disposed in the area bordered by the front roll bar, left and right side rails, and the rear roll bar of the first segment is top panel member 28, the outer (or upper) surface of which is depressed slightly inward (or downward) from the outer upper surface of the side rails. In the preferred embodiment the outer surface of the top panel member 28 is approximately ⅛-⅜ inch below the outer, upper surface of the side rails, and thus about ¼-½ inch below the outer, upper surface of the frame. The top panel member 28 is substantially horizontal.

In the area bordered by the left base member 26a, left front support member 24a, left rear support member 25a, and left side rail 27a of the first segment is left side panel member 29a. (A corresponding right side panel member 29b, which is the mirror image of left side panel member 29a, is disposed on the right side of the first segment in the area bordered by the right base member 26b, right front support member 24b, right rear support member 25b, and right side rail 27b.) Each side panel's outermost surface is depressed slightly inward from the outermost surface of the substantially vertical portion of the adjacent side rail and in the preferred embodiment it is disposed approximately ⅛-⅜ of an inch inward of the outermost surface of the side rail, or ¼-½ inch inward of the outer side surface of the frame. Each side panel member is disposed substantially vertically, although the top portion may be slanted inwardly from the bottom portion.

While all of the above described surfaces are substantially planar, as used herein the term "planar" may also include surfaces which may be slightly curved or aerodynamically contoured.

The second and third camper cap segments are very similar to the first segment. The elements of second segment 30 designated by reference numerals 31 through 39b are the same as the elements designated as reference numerals 21 through 29b, respectively, of the first segment; and similarly the elements of third segment 40 designated by reference numerals 41 through 49b are the same as elements 21 through 29b, respectively. As noted above however, the second and third segments 30 and 40 are progressively smaller in height and width than first segment 20.

The third segment 40, which is rearmost, also comprises rear flange member 51 which is disposed inwardly from the rear portions of rear roll bar 43 and rear support members 45a and 45b. A door 70 is hingeably attached to flange member 51 and in the preferred embodiment has handle 73, bottom plate 71, and tail gate panel 72. The door member 70 may be configured to be closed in locking relationship with the third segment of the camper cap in the conventional manner that rear doors are made to lock with camper shells.

With reference to FIGS. 1 and 3 it can be seen that each of the edges of the front and rear roll bars, the side rails, the front and rear support members, and the base members have a flange angled downwardly or inwardly to the outermost surface of the next inwardly disposed surface (e.g., flanges 22a and 23a). In addition, as shown in FIG. 3, at the forward edge of the downwardly sloping flange disposed at the most forward end of the front support members and front roll bars of the second and third segments, a channel 92 is formed. The purpose of this channel is to capture and direct rain water away from the inside of the camper cap in the event any water is able to bypass the seal described hereinbelow.

As shown in FIGS. 3–6, a gasket of rubber or other resilient water impermeable substance is affixed to the underside of the rear roll bar and rear support members of the first and second camper cap sections. The gaskets are designated by reference numeral 91 in both instances. In the preferred embodiment the gaskets are made of neoprene rubber with a polypropylene exterior surface and are affixed to the underside of the camper cap segments with an appropriate adhesive, such as a silicone adhesive. The gasket affixed to the underside of the rear roll bar and rear support members of the first segment should have a height which is slightly greater than the distance that would exist between the outer surfaces of the front roll bar and support members of the second segment and the underside of the rear roll bar and support members of the first segment if no gasket were affixed. Similarly, the height of the gasket affixed to the underside of the rear roll bar and rear support members of the second segment should be slightly larger than the distance between the rear roll bar and support members of the second segment and the front roll bar and support members of the third segment if no gasket were affixed. The gasket is made to be resilient so that it will compress slightly under the weight of the camper cap segment to which it is attached and thereby eliminate all gaps which might otherwise exist between the different segments and thus preventing the leakage of water into the camper cap.

The purpose of the polypropylene exterior surface of the gasket is to reduce friction as portions of the next camper cap segment are slid into and out of place under the gasket.

Dirt particles trapped in the surface of the gasket or lodged between the gasket and the outer surface of the camper cap segment beneath it will tend to scratch or otherwise mar the outer surface of the camper cap segment being slid past the gasket. By depressing the level of the major portions of the camper cap segment, the distance between the underside of the rear roll bar and rear support members of one cap segment and the outer surface of the camper cap segment sliding below it is increased so that the gasket will not expand sufficiently to fill such distance. As a result, there is no surface bearing down upon the major portions of the sliding camper cap segments, namely top panel members 38 and 48 and the side panel members 39a and 39b and 49a and 49b.

However, there must be a relatively tight fit between the rear roll bar and rear support members of one camper cap segment and the front roll bar and front support members of the camper cap segment next farthest to the rear in order for a proper seal to be made. In order to prevent the gasket from collapsing inward toward the top and side panel members, each cap segment has the side rails, which side rails have an outer surface disposed at a depth intermediate the level of the outer surfaces of the top and side panel members and the outer surface of the frame. Thus, greater protection is provided to the top and side panel members, and with respect to the outer surface of the side rail, there is less pressure thereon during sliding of the segments than if its surface were not depressed at all relative to the outer surface of the frame, and therefore the risk of, and extent of any, damage is reduced. Wear and tear on the gasket is also reduced.

Of course, depression of the outer surfaces of the top and side panel members and the side rails on the first segment is not necessary to avoid scratching because nothing slides over these surfaces. However, disposing these surfaces on the first segment in the same manner as on the second and third camper cap segments provides several advantages, including the following. A uniform appearance is provided to all of the segments. The camper cap appears to have segments of equal height and width dimensions, which further enhances the appearance of the camper cap. Also, each segment has a ribbed-like construction which increases its strength.

As shown in FIGS. 6 through 9, the bottom portions of the base members of the second and third segments are fitted, at their front and rear ends at least, with slide mounting brackets 62. Each of these brackets has disposed at its bottommost extremity a dowel 63, which acts as a load bearing member. Each dowel is approximately 1 to 2 inches in length. The dowels are sized to fit within the hexagonal-shaped channels 64 in the track assemblies 60a and 60b. (The brackets 62, dowels 63, and track assembly 60a, with channels 64 and gutters 65 and accessory rod 66, shown in FIGS. 6–9 are left side components. Corresponding components which are identical, but mirror images, of the shown components are disposed on the right side of the camper cap.) These channels run the entire length of the track assembly and provide the surfaces against which the dowels affixed to the second and third segments of the camper cap slide. The hexagonal channels are configured so that one corner of the channel points directly downward (i.e., is disposed at the lowest portion of the channel) so that to the extent dirt or other debris collects in the channel, such dirt will be away from the surfaces of the channel on which the dowels slide. The track assembly is also provided with gutters 65 which are configured and positioned to catch any water which may be collected from drain channels 92 on each of the second and third segments and provide a path along which such water may be directed out the rear end of the track assembly. At the rear of each of the left and right track assemblies is disposed a track assembly end fitting 61 which is bolted to the track assembly itself (see FIG. 1) or to the track assembly and the rear upper portion of the load bed section's side walls. End fitting 61 may have holes in it to allow for the drainage of water and to allow for the escape of dirt and other debris which may be deposited from time to time along the track. The end fitting also helps to prevent the third segment of the camper cap from being accidentally pulled off the back of the track.

In a similar manner, stops, not shown, may be screwed through the upper portions of the load bed section's side walls and through the left and right track assembly into the channel in which the second segment slides, in a position toward the forward end of the third segment. These stops prevent the second segment from being pulled back beyond the point where its front roll bar aligns directly under the rear roll bar of the first segment.

In the preferred embodiment, stops, again not shown, are screwed, from the inside toward the outside, through holes, not shown, in the forward portion of the front side support members of the second and third segments. Each stop releasably engages the flange depending inward from the rear support member to the side planar surface of the segment next forward from the segment in which the stop is screwed. Thus, starting from where the camper cap is fully retracted, the third camper cap segment may be pulled back until its stops engage the above-described flange on the second segment, and as the third segment is continued to be pulled back the second segment slides with it until the stops on the second segment engage the above-described flange on the first segment. At that point neither the second nor third camper cap segment may be pulled farther back.

The third camper cap section and the track assemblies are provided with conventional latch means (e.g., spring-loaded latch means) so that the third camper cap section may be latched either in the fully extended or fully retracted position. When the latches are set and the stops described in the paragraph above are set in place, none of the segments can move.

The left and right track assemblies have an additional accessory rod 66 disposed on their inboard sides. The purpose of the accessory rod track is to allow for the affixation of tool kits, clothing rods, and the like to the track assemblies as may be seen fit by the user.

In the preferred embodiment the track assembly and the brackets are manufactured from extruded aluminum. The dowels are manufactured of DELRIN, a self lubricating thermoplastic acetal resin (DELRIN is a trademark owned by DuPont), or other self lubricating material. The first, second, and third segments are preferably vacuum formed or molded of aluminum, fiberglass, hard polyurethane, or other substantially rigid material. The top planar surfaces and side planar surfaces may be cut out and replaced with transparent or translucent materials, such as plastic, as may be desired by potential users. The rear door is manufactured of similar materials. It has vents 74 which allow for air to flow through the camper cap.

In assembling the camper cap, the first segment is laid on top of, or bolted to, the left and right side walls of the load bed section, and the forwardmost portions of the front roll bar and left and right front supports are disposed in a removably sealed relationship with the rear of the camper cab section in a conventional manner. Track assemblies 60a and 60b are then positioned over the inwardly directed flanges 94 of the first section and bolted to the top portions of the load bed section's side walls. The second and third segments are slid onto their respective channels in the track assemblies and pushed forward, the stops are screwed in place, and end fittings 61 are then affixed to the rear of the track assemblies.

In order to remove the camper cap for storage, the fittings are removed, the stops are removed, and the third and second camper cap segments are removed. The first segment may be removed after removing or loosening the track assemblies.

Above there has been described a unique camper cap assembly for pick-up trucks. It will be understood that various other changes of the details, materials, steps, arrangements of parts, and uses, which have been herein described and illustrated in order to explain the nature of the invention, will occur to and may be made by those skilled in the art, upon a reading of this disclosure, and such changes are intended to be included within the principles and scope of this invention.

We claim:

1. A telescopic cover assembly for a vehicle having a cab section and a load bed section, said load bed section extending rearwardly from the cab section of the vehicle and comprising a front disposed near the cab section and a rear disposed distally from the cab section, a generally rectangular bed, and left and right walls upstanding along left and right sides, respectively, of the bed, as viewed looking from the rear of the load bed section toward the cab section, said cover assembly comprising a fixed cover member which is fixedly mounted atop said walls, at least one movable cover member which is slidably mounted atop said walls, and left and right track assemblies mounted upon said left and right walls, respectively, and into which said at least one movable cover member is slidably engaged, wherein each of said at least one movable cover member comprises:

a frame member having left and right base members disposed opposite each other, each base member having a front end disposed toward the cab section of the vehicle and a rear end disposed toward the rear of the load bed section, said left base member being disposed leftward of said right base member as viewed looking from the rear of the load bed section toward the cab section, left and right front support members extending upwards from the front ends of the left and right base members, respectively, left and right rear support members extending upwards from the rear ends of the left and right base members, respectively, each of the front and rear support members having a top end extending a vertical height above the base members, said vertical height being substantially the same for each support member of the movable cover member, a front roll bar having a left end and right end, the left end of the front roll bar being connected to the top end of the left front support member and the right end of the front roll bar being connected to the top end of the right front support member, and a rear roll bar having a left end and a right end, the left end of the rear roll bar being connected to the top end of the left rear support member and the right end of the rear roll bar being connected to the top end of the right rear support member; a top panel member disposed in a substantially horizontal plane between the front and rear roll bars, said to panel member having a front edge connected to said front roll bar and a rear edge connected to said rear roll bar; a left side panel members disposed in a substantially vertical plane between the left front and rear support members; and a right side panel member disposed in a substantially vertical plane between the right front and rear support members; each of said left and right side panels members a forward edge connected to the left and right front support members, respectively, and each of said left and right side panel members having a rearward edge connected to the left and right rear support members, respectively, the front and rear roll bars each having an outer surface facing upwardly and lying substantially in a horizontal plane, said top panel member having an outer surface facing upwardly and being depressed inwardly from the outer surface of said front and rear roll bars, said front and rear support members each having an outer surface lying substantially in a vertical plane, and each of said left and right side panel members having an outer surface which is depressed inwardly from the outer surface of the front and rear support members to which it is attached;

whereby scratching of the top panel member and the left and right side panel members is minimized as each said movable cover member is moved in telescoping relation to other cover members.

2. A telescopic cover assembly for a vehicle having a cab section and a load bed section, said load bed section extending rearwardly from the cab section of the vehicle and comprising a front disposed near the cab section and a rear disposed distally from the cab section, a generally rectangular bed, and left and right walls upstanding along left and right sides, respectively, of the bed, as viewed looking from the rear of the load bed section toward the cab section, said cover assembly comprising a fixed cover member which is fixedly mounted atop said walls, at least one movable cover member which is slidably mounted atop said walls, and left and right track assemblies mounted upon said left and right walls, respectively, and into which said at least one movable cover member is slidably engaged, wherein each of said at least one movable cover member comprises:

a frame member having left and right base members disposed opposite each other, each base member having a front end disposed toward the cab section of the vehicle and a rear end disposed toward the rear of the load bed section, said left base member being disposed leftward of said right base member as viewed looking from the rear of the load bed section toward the cab section, left and right front support members extending upwards from the front ends of the left and right base members, respectively, left and right rear support members extending upwards from the rear ends of the left and right base members, respectively, each of the front and rear support members having a top end extending a vertical height above the base members, said vertical height being substantially the same for each support member of the movable cover member, a front roll bar having a left end and a right end, the left end of the front roll bar being connect ed to the top end of the left front support member and the right end of the front roll bar being connected to the top end of the right front support member, and a rear roll bar having a left end and a right end, the left end of the rear roll bar being connected to the top end of the left rear support member and the right end of the rear roll bar being connected to the top end of the right rear support member; a top panel member disposed in a substantially horizontal plane between the front and rear roll bars, said top panel member having a front edge connected to said front roll bar and a rear edge connected to said rear roll bar; a left side panel member disposed in a substantially vertical plane between the left front and rear support members; and a right side panel member disposed in a substantially vertical plane between the right front and rear support members; each of said left and right side panel members having a forward edge connected to the left and right front support members, respectively, and each of said left and right side panel members having a rearward edge connected to the left and right rear support members, respectively, the front and rear roll bars each having an outer surface facing upwardly and lying substantially in a horizontal plane, said top panel member having an outer surface facing upwardly and being depressed inwardly from the outer surface of said front and rear roll bars, said front and rear support members each having an outer surface lying substantially in a vertical plane, and each of said left and right side panel members having an outer surface which is depressed inwardly from the outer surface of the front and rear support members to which it is attached;

wherein each said movable cover member further comprises a left side rail member extending from approximately the left end of the front roll bar to approximately the left end of the rear roll bar and a right side rail member extending from approximately the right end of the front roll bar to approximately the right end of the rear roll bar, each of said left and right side rail members having a substantially horizontal outer surface depressed inwardly from the outer surface of the front and rear roll bars, but not as far inwardly as the outer surface of said top panel member, said top panel member being bordered by said front and rear roll bars and said left and right side rail members.

3. The cover assembly of claim 2 wherein said left side rail member further comprises an outer surface lying substantially in a vertical plane and facing to the left as viewed looking from the rear of the load bed section toward the cab section, and said right side rail member further comprises an outer surface lying substantially in another vertical plane and facing to the right as viewed looking from the rear of the load bed section toward the cab section, the substantially vertical outer surface of said left side rail member being depressed inwardly from the outer surface of said left front and rear support members, but not as far inwardly as the outer surface of said left side panel member, said left side panel member being bordered by said left base member, said left front and rear support members, and said left side rail member, the substantially vertical outer surface of said right side rail member being depressed inwardly from the outer surface of said right front and rear support members, but not as far inwardly as the outer surface of said right side panel member, said right side panel member being bordered by said right base member, said right front and rear support members, and said right side rail member, wherein the left base member has an outer surface lying in a substantially vertical plane and the right base member has an outer surface lying in another substantially vertical plane, and wherein the outer surface of said left front and rear support members and the left base member is a continuous surface and the outer surface of said right front and rear support members and the right base member is another continuous surface.

4. A telescopic cover assembly for a vehicle having a cab section and a load bed section, said load bed section extending rearwardly from the cab section of the vehicle and comprising a front disposed near the cab section and a rear disposed distally from the cab section, a generally rectangular bed, and left and right walls upstanding along left and right sides, respectively, of the bed, as viewed looking from the rear of the load bed section toward the cab section, said cover assembly comprising a fixed cover member which is fixedly mounted atop said walls, at least one movable cover member which is slidably mounted atop said walls, and left and right track assemblies mounted upon said left and right walls, respectively, and into which said at least one movable cover member is slidably engaged, wherein each of said at least one movable cover member comprises:

a frame member having left and right base members disposed opposite each other, each base member having a front end disposed toward the cab section of the vehicle and a rear end disposed toward the rear of the load bed section, said left base member being disposed leftward of said right base member as viewed looking from the rear of the load bed section toward the cab section, left and right front support members extending upwards from the front ends of the left and right base members, respectively, left and right rear support members extending upwards from the rear ends of the left and right base members, respectively, each of the front and rear support members having a top end extending a vertical height above the base members, said vertical height being substantially the same for each support member of the movable cover member, a front roll bar having a left end and a right end, the left end of the front roll bar being connected to the top end of the left front support member and the right end of the front roll bar being connected to the top end of the right front support member, and a rear roll bar having a left end and a right end, the left end of the rear roll bar being connected to the top end of the left rear support member and the right end of the rear roll bar being connected to the top end of the right rear support member; a top panel member disposed in a substantially horizontal plane between the front and rear roll bars, said top panel member having a front edge connected to said front roll bar and a rear edge connected to said rear roll bar; a left side panel member disposed in a substantially vertical plane between the left front and rear support members; and a right side panel member disposed in a substantially vertical plane between the right front and rear support members; each of said left and right side panel members having a forward edge connected to the left and right front support members, respectively, and each of said left and right side panel members having a rearward edge connected to the left and right rear support members, respectively, the front and rear roll bars each having an outer surface facing upwardly and lying substantially in a horizontal plane, said top panel member having an outer surface facing upwardly and being depressed inwardly from the outer surface of said front and rear roll bars, said front and rear support members each having an outer surface lying substantially in a vertical plane, and each of said left and right side panel members having an outer surface which is depressed inwardly from the outer surface of the front and rear support members to which it is attached;

wherein each said movable cover member further comprises a left side rail member extending from approximately the left end of the front roll bar to approximately the left end of the rear roll bar and a right side rail member extending from approximately the right end of the front roll bar to approximately the right end of the rear roll bar, each of said left and right side rail members having a substantially horizontal outer surface depressed inwardly from the outer surface of the front and rear roll bars, but not as far inwardly as the outer surface of said top panel member, said top panel member being bordered by said front and rear roll bars and said left and right side rail members;

wherein said left side rail member further comprises an outer surface lying substantially in a vertical plane and facing to the left as viewed looking from the rear of the load bed section toward the cab section, and said right side rail member further comprises an outer surface lying substantially in another vertical plane and facing to the right as viewed looking from the rear of the load bed section toward the cab section, the substantially vertical outer surface of said left side rail member being depressed inwardly from the outer surface of said left front and rear support members, but not as far inwardly as the outer surface of said left side panel member, said left side panel member being bordered by said left base member, said left front and rear support members, and said left side rail member, the substantially vertical outer surface of said right side rail member being depressed inwardly from the outer surface of said right front and rear support members, but not as far inwardly as the outer surface of said right side panel member, said right side panel member being bordered by said right base member, said right front and rear support members, and said right side rail member, wherein the left base member has an outer surface lying in a substantially vertical plane and the right base member has an outer surface lying in another substantially vertical plane, and wherein the outer surface of said left front and rear support members and the left base member is a continuous surface and the outer surface of said right front and rear support members and the right base member is another continuous surface; and wherein each of said track assemblies comprises a separate channel for each said movable cover member, each said channel having an opening running along a substantial length of the channel, said opening having a hexagonal shape with a corner forming the opening's lowest point when said channel is viewed from the rear of the load bed section, and wherein each base member of each said movable cover member has at least one bracket member connected to it, each bracket member having connected thereto and extending below the base member a sliding member of substantially circular lateral cross section, each said sliding member being slidably engaged in said channel for said movable cover member.

5. The cover assembly of claim 4 wherein said fixed cover member comprises:

a frame member having left and right base members disposed opposite each other, each base member having a front end disposed toward the cab section of the vehicle and a rear end disposed toward the rear of the load bed section, said left base member being disposed leftward of said right base member as viewed looking from the rear of the load bed section toward the cab section, left and right front support members extending upwards from the front ends of the left and right base members, respectively, left and right rear support members extending upwards from the rear ends of the left and right base members, respectively, each of the front and rear support members having a top end extending a vertical height above the base members, said vertical height being substantially the same for each support member of the fixed cover member, a front roll bar having a left end and a right end, the left end of the front roll bar being connected to the top end of the left front support member and the right end of the front roll bar being connected to the top end of the right front support member, and a rear roll bar having a left end and a right end, the left end of the rear roll bar being connected to the top end of the left rear support member and the right end of the rear roll bar being connected to the top end of the right rear support member; a top panel member disposed in a substantially horizontal plane between the front and rear roll bars, said top panel member having a front edge connected to said front roll bar and a rear edge connected to said rear roll bar; a left side panel member disposed in a substantially vertical plane between the left front and rear support members; a right side panel member disposed in a substantially vertical plane between the right front and rear support members, each of said left and right side panel members having a forward edge connected to the left and right front support members, respectively, and each of said left and right side panel members having a rearward edge connected to the left and right rear support members, respectively, the front and rear roll bars each having an outer surface facing upwardly and lying substantially in a horizontal plane, said top panel member having an outer surface facing upwardly and being depressed inwardly from the outer surface of said front and rear roll bars, said front and rear support members each having an outer surface lying substantially in a vertical plane, and each of said left and right side panel members having an outer surface which is depressed inwardly from the outer surface of the front and rear support members to which it is attached; and a left side rail member extending from approximately the left end of the front roll bar to approximately the left end of the rear roll bar and a right side rail member extending from approximately the right end of the front roll bar to approximately the right end of the rear roll bar, each of said left and right side rail members having a substantially horizontal outer surface depressed inwardly from the outer surface of the front and rear roll bars, but not as far inwardly as the outer surface of said top panel member, said top panel member being bordered by said front and rear roll bars and said left and right side rail members;

wherein said left side rail member further comprises an outer surface lying substantially in a vertical plane and facing to the left as viewed looking from the rear of the load bed section toward the cab section, and said right side rail member further comprises an outer surface lying substantially in another vertical plane and facing to the right as viewed looking from the rear of the load bed section toward the cab section, the substantially vertical outer surface of said left side rail member being depressed inwardly from the outer surface of said left front and rear support members, but not as far inwardly as the outer surface of said left side panel member, said left side panel member being bordered by said left base member, said left front and rear support members, and said left side rail member, the substantially vertical outer surface of said right side rail member being depressed inwardly from the outer surface of said right front and rear support members, but not as far inwardly as the outer surface of said right side panel member, said right side panel member being bordered by said right base member, said right front and rear support members, and said right side rail member, wherein the left base member has an outer surface lying in a substantially vertical plane and the right base member has an outer surface lying in another substantially vertical plane, and wherein the outer surface of said left front and rear support members and the left base member is a continuous surface and the outer surface of said right front and rear support members and the right base member is another continuous surface.

6. The cover assembly of claim 5 wherein said fixed cover member and each said movable cover member have inner surfaces substantially parallel to the outer surfaces, each cover member being formed as a shell, and wherein each of said fixed cover member and each said movable cover member, except for a movable cover member disposed closest to the rear of the load bed section, further comprises sealing means affixed to the inner surface of said rear roll bar and said left and right rear support members.

* * * * *